United States Patent
Wu (10) Patent No.: US 11,947,564 B2
(45) Date of Patent: Apr. 2, 2024

(54) BLOCKCHAIN-BASED DATA PROCESSING METHOD AND DEVICE

(71) Applicant: Advanced New Technologies Co., Ltd., Grand Cayman (KY)

(72) Inventor: Hao Wu, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 207 days.

(21) Appl. No.: 17/688,639

(22) Filed: Mar. 7, 2022

(65) Prior Publication Data

US 2022/0188331 A1   Jun. 16, 2022

Related U.S. Application Data

(63) Continuation of application No. 16/034,137, filed on Jul. 12, 2018, now Pat. No. 11,269,916.

(30) Foreign Application Priority Data

Jul. 14, 2017   (CN) .......................... 201710575008.4

(51) Int. Cl.
*G06F 16/27* (2019.01)
*G06F 16/18* (2019.01)
(Continued)

(52) U.S. Cl.
CPC .......... *G06F 16/27* (2019.01); *G06F 16/1805* (2019.01); *G06Q 20/02* (2013.01);
(Continued)

(58) Field of Classification Search
CPC ..... H04L 9/0637; H04L 9/3239; H04L 47/62; H04L 63/0428
(Continued)

(56) References Cited

U.S. PATENT DOCUMENTS 7,711,797 B1   5/2010   Huang
9,529,923 B1   12/2016  Baird, III
(Continued)

FOREIGN PATENT DOCUMENTS

CN   105719185   6/2016
CN   106157142   11/2016
(Continued)

OTHER PUBLICATIONS

Baliga, Arati, Solanki, Nitesh, Verekar, Shubhann, Pednekar, Annol, Kannat, Pandurang, Chatterjee, Siddhartha, "Performance Characterization of Hyperledger fabric", Jun. 20, 2018, https://ieeexplore.ieee.org/abstract/docunnent/8525394 (Year: 2018).
(Continued)

*Primary Examiner* — Hermon Asres
(74) *Attorney, Agent, or Firm* — Fish & Richardson P.C.

(57) ABSTRACT

The present disclosure relates to blockchain-based data processing methods and devices to achieve balance between a service need and system resource consumption. In one example method, an amount of service data processed by consensus in a blockchain in a specified time period is monitored. A determination is made as to whether the monitored amount of processed service data in the specified time period is less than a specified first threshold or more than a specified second threshold. In response to determining that the monitored amount of processed service data in the specified time period is less than the specified first threshold or more than the specified second threshold, a block generation time for the blockchain is dynamically adjusted. A new block in the blockchain is then dynamically adjusted based on the adjusted block generation time.

19 Claims, 6 Drawing Sheets

(51) Int. Cl.

| | |
|---|---|
| *G06Q 20/02* | (2012.01) |
| *G06Q 20/06* | (2012.01) |
| *G06Q 20/08* | (2012.01) |
| *G06Q 20/38* | (2012.01) |
| *G06Q 20/40* | (2012.01) |
| *H04L 9/00* | (2022.01) |
| *H04L 9/06* | (2006.01) |
| *H04L 9/32* | (2006.01) |
| *H04L 9/40* | (2022.01) |
| *H04L 47/62* | (2022.01) |

(52) U.S. Cl.
CPC .......... *G06Q 20/06* (2013.01); *G06Q 20/085* (2013.01); *G06Q 20/3827* (2013.01); *G06Q 20/3829* (2013.01); *G06Q 20/401* (2013.01); *G06Q 20/405* (2013.01); *H04L 9/0637* (2013.01); *H04L 9/3239* (2013.01); *H04L 9/3297* (2013.01); *H04L 47/62* (2013.01); *H04L 63/0428* (2013.01); *H04L 63/10* (2013.01); *H04L 9/50* (2022.05)

(58) Field of Classification Search
USPC .......................................................... 709/203
See application file for complete search history.

(56) References Cited

U.S. PATENT DOCUMENTS

| | | | |
|---|---|---|---|
| 9,569,771 | B2 | 2/2017 | Lesavich et al. |
| 9,626,120 | B1 | 4/2017 | Jia et al. |
| 10,114,969 | B1 | 10/2018 | Chaney et al. |
| 11,269,916 | B2 | 3/2022 | Wu |
| 2002/0198827 | A1 | 12/2002 | van Leeuwen |
| 2011/0154073 | A1 | 6/2011 | Wang et al. |
| 2016/0342977 | A1 | 11/2016 | Lam |
| 2017/0103458 | A1* | 4/2017 | Pierce .................... G06Q 40/04 |
| 2017/0323392 | A1 | 11/2017 | Kasper et al. |
| 2018/0005318 | A1* | 1/2018 | Pierce .................. G06Q 20/065 |
| 2018/0114205 | A1 | 4/2018 | Thomas et al. |
| 2018/0219669 | A1* | 8/2018 | Chen ....................... H04L 9/002 |
| 2018/0294967 | A1 | 10/2018 | Roberts et al. |
| 2018/0328612 | A1 | 11/2018 | Sinha et al. |
| 2019/0120929 | A1* | 4/2019 | Meadow ................... G01S 5/14 |
| 2019/0251187 | A1 | 8/2019 | Lin |
| 2020/0065872 | A1* | 2/2020 | Tang .................. G06Q 30/0185 |

FOREIGN PATENT DOCUMENTS

| | | |
|---|---|---|
| CN | 106251144 | 12/2016 |
| CN | 106296191 | 1/2017 |
| CN | 106411774 | 2/2017 |
| CN | 106506203 | 3/2017 |
| CN | 106528746 | 3/2017 |
| CN | 106682984 | 5/2017 |
| CN | 106874393 | 6/2017 |
| CN | 107067242 | 8/2017 |
| CN | 107733651 | 2/2018 |
| EP | 3070893 | 9/2016 |
| WO | WO 2016007904 | 1/2016 |
| WO | WO 2017010455 | 1/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/US2018/042083, dated Oct. 12, 2018, 16 pages.

Kraft, "Difficulty control for blockchain-based consensus systems," Peer-to-Peer Networking and Applications, 2016, 9(2):397-413.

Nakamoto, "Bitcoin: A Peer-to-Peer Electronic Cash System," www.bitcoin.org. 2005, 9 pages.

PCT International Preliminary Report on Patentability in International Application No. PCT/US2018/042083, dated Jul. 5, 2019, 8 pages.

Reiss, Frederick, Stockinger, Kurt, Wu, Kesheng, Shoshani, Arie, Hellerstein, Joseph M., "Enabling Real-Time Querying of Live and Historical Stream Data," Jul. 9, 2007, https://ieeexplore.ieee.org/abstract/docunnent/4274973 (Year: 2007).

Watanabe et al., "Technology and Challenges of Blockchain Platforms". The Institute ff Electronics, Information and Communication Engineers, Jul. 2017, 8 pages (with English Abstract).

* cited by examiner

BLOCKCHAIN-BASED DATA PROCESSING METHOD AND DEVICE

CROSS-REFERENCE TO RELATED APPLICATIONS

This application is a continuation of and claims the benefit of priority of U.S. patent application Ser. No. 16/034,137, filed on Jul. 12, 2018, which claims priority to Chinese Patent Application No. 201710575008.4, filed on Jul. 14, 2017, which is hereby incorporated by reference in its entirety.

TECHNICAL FIELD

The present application relates to the field of Internet information processing technologies and the field of computer technologies, and in particular, to a blockchain-based data processing method and device.

BACKGROUND

Blockchain technology is also referred to as a distributed ledger technology, and is a distributed Internet database technology characterized by decentralization, transparency, tamper-resistance, trust, etc. A blockchain network can be constructed based on the blockchain technology. As a logical data structure in the blockchain network, a block can be used to store service data, but the block in the blockchain network is dynamically generated.

During an actual application, the blocks are usually generated based on a specified time interval (for example, one block is generated every ten minutes or an even longer time). The blocks store service data that is generated in the specified time interval.

However, with the development of science and technologies, the amount of service data is changing, and the data amount can be varied. Therefore, based on the existing block generation mechanism, the balance between a service need and the system resource consumption cannot be achieved.

SUMMARY

Implementations of the present application provide a blockchain-based data processing method and device to achieve balance between a service need and system resource consumption.

The following technical solutions are used in the implementations of the present application:

An implementation of the present application provides a blockchain-based data processing method, including the following: monitoring an amount of service data processed by consensus in a specified time period; dynamically adjusting a block generation time based on the amount of processed data; and generating a new block based on the adjusted time.

An implementation of the present application further provides a blockchain-based data processing device, including the following: a monitoring unit, configured to monitor an amount of service data processed by consensus in a specified time period; an adjustment unit, configured to dynamically adjust a block generation time based on the amount of processed data; and a processing unit, configured to generate a new block based on the adjusted time.

An implementation of the present application further provides a blockchain-based data processing device, including at least one memory and at least one processor, where the memory stores a program, and at least one of the processors are configured to perform the following steps: monitoring an amount of service data processed by consensus in a specified time period; dynamically adjusting a block generation time based on the amount of processed data; and generating a new block based on the adjusted time.

The following beneficial effects can be achieved by using at least one of the technical solutions used in the implementations of the present application.

In the implementations of the present application, an amount of the service data processed by consensus in a specified time period is monitored. A block generation time is dynamically adjusted based on the amount of processed data, and a new block is generated based on the adjusted time. As such, a block generation speed can match service data variation, which satisfies a service need and ensures system resource utilization when service data is processed by consensus, so the system resource utilization does not fluctuate. Therefore, the balance between the service need and the system resource consumption is effectively achieved.

BRIEF DESCRIPTION OF DRAWINGS

The accompanying drawings described here are intended to provide a further understanding of the present application, and constitute a part of the present application. The example implementations of the present application and descriptions of the example implementations are intended to describe the present application, and constitute no limitations on the present application. In the accompanying drawings.

DESCRIPTION OF IMPLEMENTATIONS

Based on an existing block generation mechanism, if a service data generation speed is far greater than a block generation speed, a large amount of service data is accumulated, and the service data processing efficiency is reduced. If a service data generation speed is slower than a block generation speed, a small amount of service data is to be processed by consensus, and system resources are wasted (because system resources are constantly consumed to initiate one consensus).

To make the objectives, technical solutions, and advantages of the present application clearer, the following will clearly describe the technical solutions of the present application with reference to the specific implementations of the present application and the corresponding accompanying drawings. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
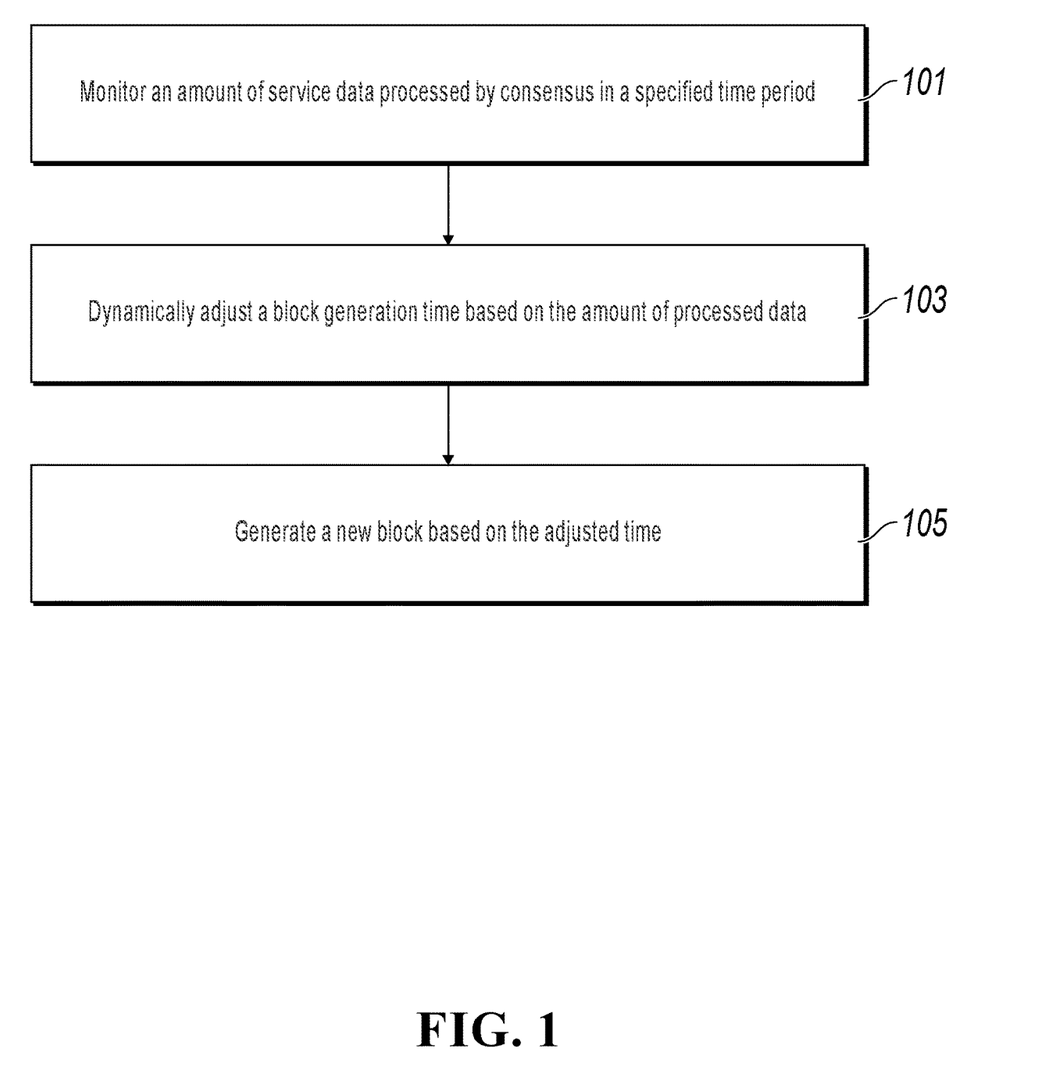
FIG. 1 is a schematic flowchart illustrating a blockchain-based data processing method, according to an implementation of the present application.

FIG. 1 is a schematic flowchart illustrating a blockchain-based data processing method, according to an implementation of the present application. The method can be described as follows: The implementation of the present application can be performed by a blockchain node in a blockchain network or another device independent of a blockchain node, so as to control a block generation speed.

Step 101: Monitor an amount of service data processed by consensus in a specified time period.

In the implementation of the present application, one blockchain node can be used as a monitoring object, and an amount of service data processed by the blockchain node by consensus in the specified time period is monitored. Alternatively, a plurality of blockchain nodes can be separately used as monitoring objects, and amounts of service data processed by the different blockchain nodes by consensus in the specified time period are separately monitored. It is not limited here.

In the following descriptions, an amount of service data processed by one blockchain node by consensus in the specified time period is monitored.

In the implementation of the present application, before adjusting a block generation time, a block can be generated based on a specified reference time. In other words, one new block is generated when the reference time expires. Therefore, service data is generated in a period from the last reference time to a current reference time.

The reference time here can be a duration or a timestamp. It is not limited here.

After the new block is generated, the generated service data is processed by consensus, and then the service data processed by consensus is stored on the new block.

The specified time period can be determined based on the block generation reference time or based on an actual need. It is not limited here.

In the implementation of the present application, if a small amount of service data is generated, the amount of service data processed by consensus in the specified time period can be understood as the amount of generated service data. If a large amount of service data is generated (one block is not large enough to store the generated service data), the service data processed by consensus in the specified time period can be understood as the amount of service data that is actually obtained by a consensus.

When the amount of service data processed by consensus in the specified time period is monitored the amount of service data processed by consensus in n consecutive specified time periods can be further monitored to ensure accuracy of subsequently adjusting the block generation time, where n is a natural number. The specified time period is determined based on the block generation time.

Preferably, in the implementation of the present application, a reference amount of processed service data can be further determined. The reference amount of processed data can be determined based on a block capacity or an actual need. It is not limited here.

Step 103: Dynamically adjust a block generation time based on the amount of processed data.

In the implementation of the present application the block generation time is prolonged by a specified first duration if the amount of processed data is less than a specified first threshold.

The block generation time is shortened by a specified second duration if the amount of processed data is greater than a specified second threshold.

The first threshold here can be determined based on the reference amount of processed data, the minimum service data processing capability of the blockchain node, or the maximum service data processing capability of the blockchain node. It is not limited here.

Preferably, in the implementation of the present application, if the amounts of service data processed by consensus in the n consecutive specified time periods are monitored in step 101, the block generation time is dynamically adjusted based on the amounts of processed data that correspond to the specified time periods.

If the amounts of processed data that correspond to the specified time periods progressively increase and the maximum amount of processed data is greater than a specified second threshold, the block generation time is shortened by a specified second duration.

If the amounts of processed data that correspond to the specified time periods progressively decrease and the minimum amount of processed data is less than a specified first threshold, the block generation time is prolonged by a specified first duration.

The first duration here can be an integral multiple of the block generation reference time. For example, assume that the reference time is a duration, for example, a duration T In this situation, the first duration can be a*T, and the block generation time is T+a*T after being prolonged by the first duration, where a is a positive number. The second duration here can be a fractional multiple of the block generation reference time. For example, assume that the reference time is a duration, for example, a duration T. In this situation, the second duration can be b*T, and the block generation time is T−b*T after being shortened by the second duration, where b is a positive number and is less than 1.

Step 105: Generate a new block based on the adjusted time.

In the implementation of the present application, the new block is dynamically generated based on the adjusted time.

If the adjusted time is longer than the reference time, the calculation difficulty could increase to decelerate block generation. If the adjusted time is shorter than the reference time, the calculation difficulty could decrease to accelerate block generation.

In the technical solution provided in the present application, an amount of service data processed by consensus in a specified time period is monitored. A block generation time is dynamically adjusted based on the amount of processed data, and a new block is generated based on the adjusted time. As such, a block generation speed can match service data variation, which satisfies a service need and ensures system resource utilization when service data is processed by consensus, so the system resource utilization does not fluctuate. Therefore, the balance between the service need and the system resource consumption is effectively achieved.

Figure 2:
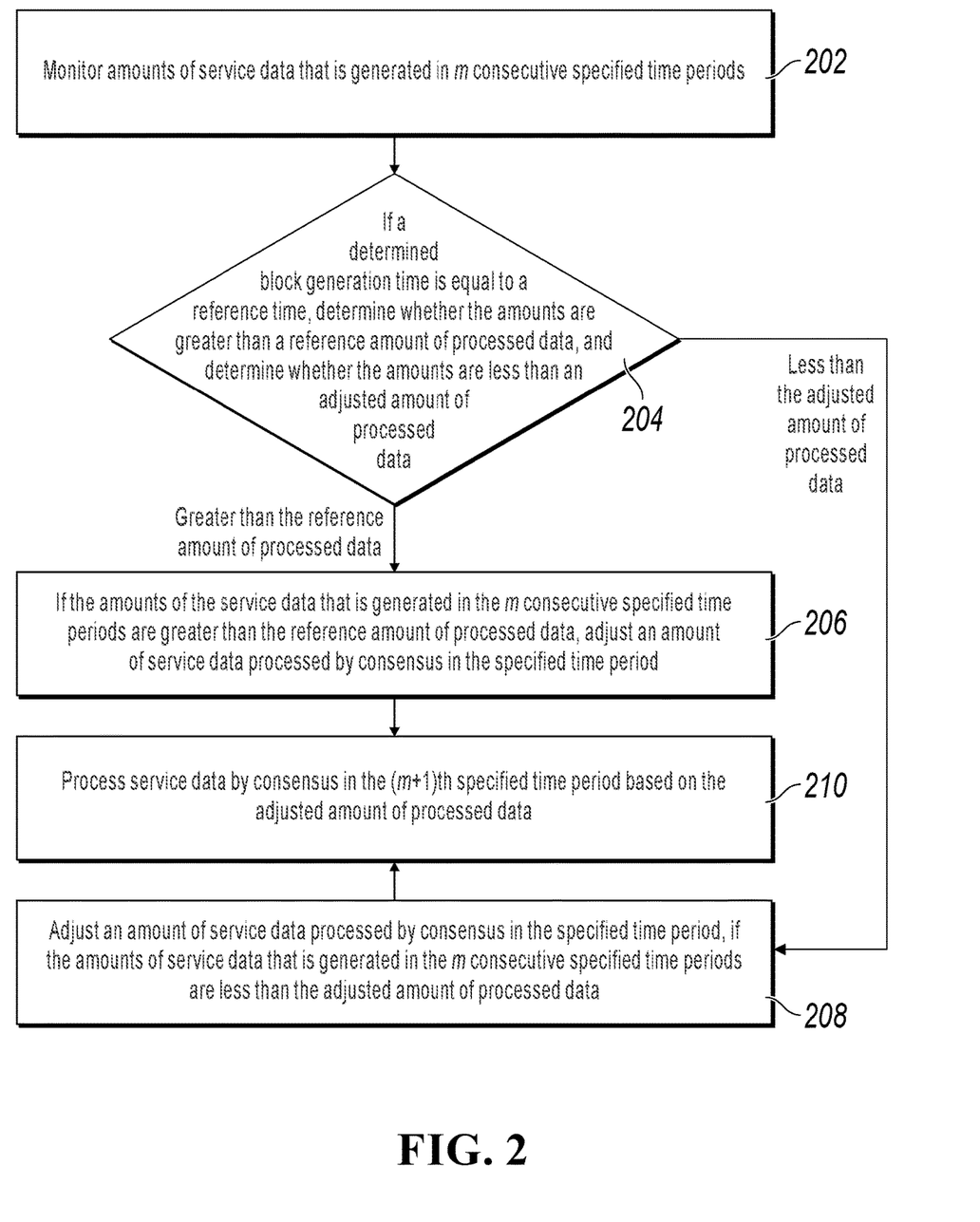
FIG. 2 is a schematic flowchart illustrating a blockchain-based data processing method, according to an implementation of the present application.

FIG. 2 is a schematic flowchart illustrating a blockchain-based data processing method, according to an implementation of the present application. The method can be described as follows: If a block generation time remains unchanged, in the implementation of the present application, an amount of service data processed by consensus can be further dynamically adjusted to improve system resource utilization, thereby achieving balance between a service need and system resource consumption.

Step 202: Monitor amounts of service data that is generated in m consecutive specified time periods.

Here, m is less than n and is a natural number.

Step 204: If a determined block generation time is equal to a reference time, determine whether the amounts are greater than a reference amount of processed data, and determine whether the amounts are less than an adjusted amount of processed data; and if the amounts are greater than the reference amount of processed data, perform step 206; or if the amounts are less than the adjusted amount of processed data, perform step 208.

In the implementation of the present application, assume that the block generation time is the reference time, but the amount of service data changes as a service is being executed. If the amount of service data is less than the reference amount of processed data, all generated service data can be processed by consensus when a new block is generated.

If the amount of service data is greater than the reference amount of processed data, step 206 needs to be performed. That is, the amount of each service data processed by consensus is increased to ensure the system resource utilization.

Step 206: If the amounts of service data that is generated in the m consecutive specified time periods are greater than the reference amount of processed data, adjust an amount of service data processed by consensus in the specified time period, and skip to step 210.

In the implementation of the present application, adjusting the amount of service data processed by consensus in the specified time period can be understood as increasing the amount of processed data. Here, an extent to which the amount of processed data is increased can be determined based on the reference amount of processed service data.

Step 208: Adjust an amount of service data processed by consensus in the specified time period, where m is less than n and is a natural number, if the amounts of service data that is generated in the m consecutive specified time periods are less than the adjusted amount of processed data.

In the implementation of the present application, if the amounts of service data that is generated in the m consecutive specified time periods are less than the adjusted amount of processed data, it indicates that service data generation is decelerating. In this situation, the amount of service data processed by consensus in the specified time period needs to be decreased.

Step 210: Process service data by consensus in the (m+1)th specified time period based on the adjusted amount of processed data.

Figure 3:
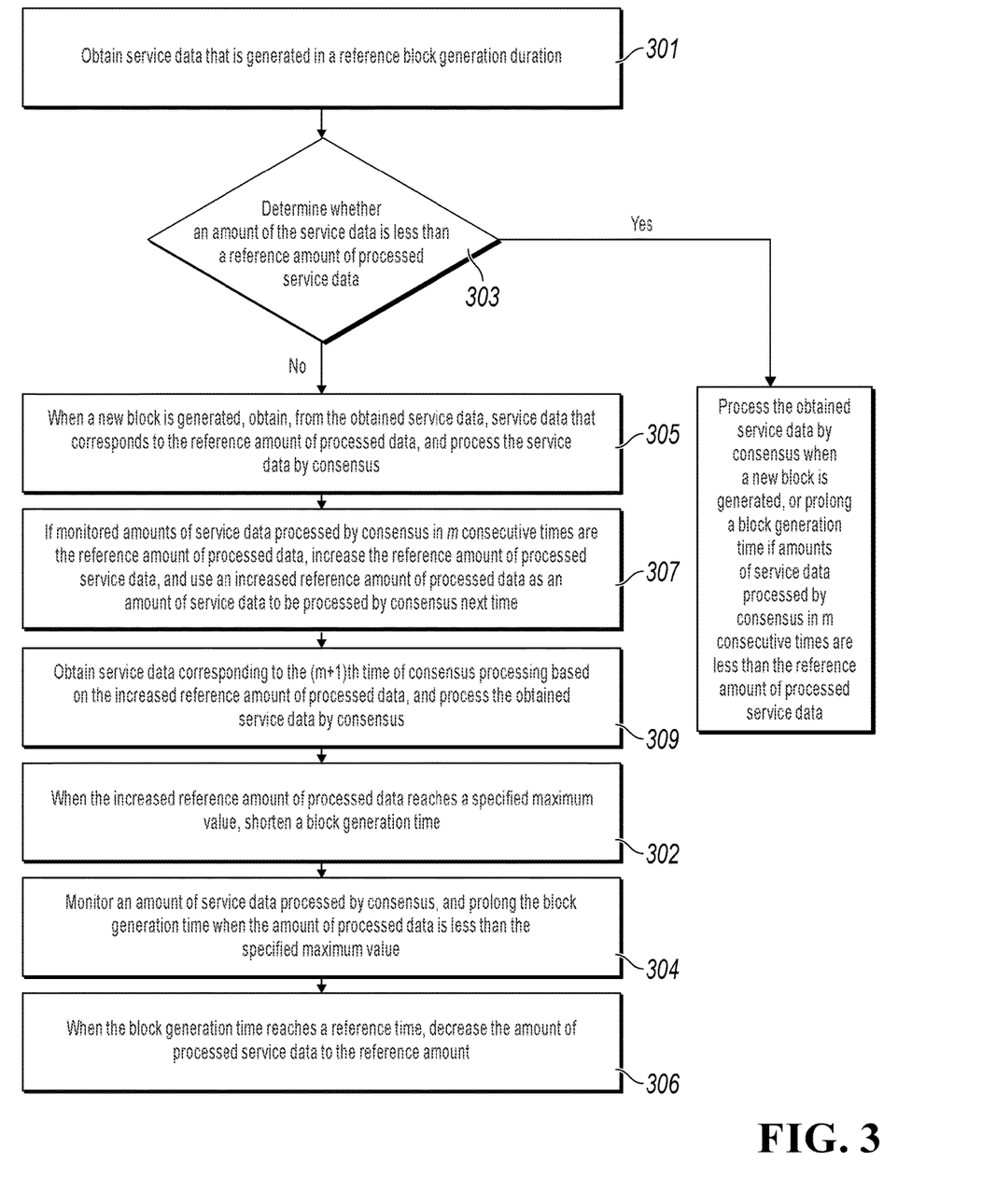
FIG. 3 is a schematic flowchart illustrating a blockchain-based data processing method, according to an implementation of the present application.

FIG. 3 is a schematic flowchart illustrating a blockchain-based data processing method, according to an implementation of the present application. The method can be described as follows:

Step 301: Obtain service data that is generated in a reference block generation duration.

Step 303: Determine whether an amount of the service data is less than a reference amount of processed service data; and if yes, process the obtained service data by consensus when a new block is generated, or prolong a block generation time if amounts of service data processed by consensus in m consecutive times are less than the reference amount of processed service data; or if no, perform step 305.

Step 305: When a new block is generated, obtain, from the obtained service data, service data that corresponds to the reference amount of processed data, and process the service data by consensus.

Step 307: If monitored amounts of service data processed by consensus in the m consecutive times are the reference amount of processed data, increase the reference amount of processed service data, and use an increased reference amount of processed data as an amount of service data to be processed by consensus next time.

Step 309: Obtain service data corresponding to the (m+1)th time of consensus processing based on the increased reference amount of processed data, and process the obtained service data by consensus.

Step 302: When the increased reference amount of processed data reaches a specified maximum value, shorten a block generation time.

Step 304: Monitor an amount of service data processed by consensus, and prolong the block generation time when the amount of processed data is less than the specified maximum value.

Step 306: When the block generation time reaches a reference time, decrease the amount of processed service data to the reference amount.

Figure 4:
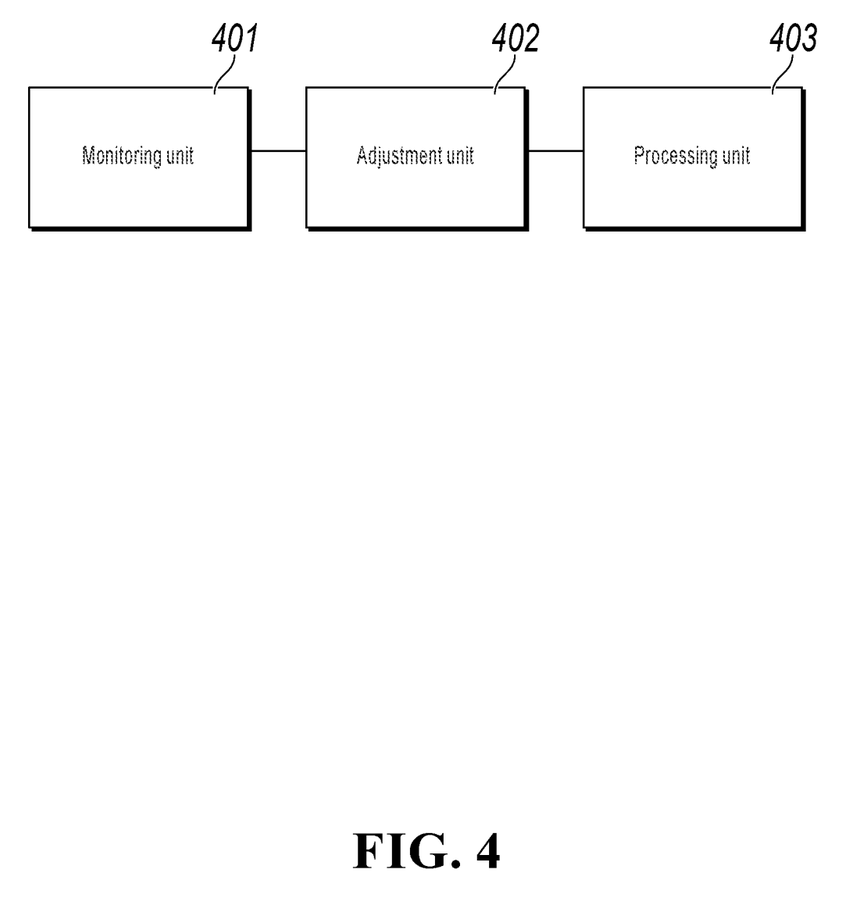
FIG. 4 is a schematic structural diagram illustrating a blockchain-based data processing device, according to an implementation of the present application.

FIG. 4 is a schematic structural diagram illustrating a blockchain-based data processing device, according to an implementation of the present application. The data processing device includes a monitoring unit 401, an adjustment unit 402, and a processing unit 403.

The monitoring unit 401 is configured to monitor an amount of service data processed by consensus in a specified time period.

The adjustment unit 402 is configured to dynamically adjust a block generation time based on the amount of processed data.

The processing unit 403 is configured to generate a new block based on the adjusted time.

In another implementation of the present application, the adjustment unit 402 is further configured to, prolong the block generation time by a specified first duration if the amount of processed data is less than a specified first threshold. Alternatively, shorten the block generation time by a specified second duration if the amount of processed data is greater than a specified second threshold.

In another implementation of the present application, the monitoring unit 401 is further configured to monitor amounts of service data processed by consensus in n consecutive specified time periods, where n is a natural number. The specified time period is determined based on the block generation time.

The adjustment unit 402 is further configured to dynamically adjust the block generation time based on the amounts of processed data that correspond to the specified time periods.

In another implementation of the present application, the adjustment unit 402 is further configured to shorten the block generation time by a specified second duration if the amounts of processed data that correspond to the specified time periods progressively increase and the maximum amount of processed data is greater than a specified second threshold.

In another implementation of the present application, the adjustment unit 402 is further configured to prolong the block generation time by a specified first duration if the amounts of processed data that correspond to the specified time periods progressively decrease and the minimum amount of processed data is less than a specified first threshold.

In another implementation of the present application, the adjustment unit 402 is further configured to, adjust the amount of service data processed by consensus in the specified time period, where m is less than n and is a natural number, if the determined block generation time is equal to a reference time and accumulated amounts of service data that is generated in m consecutive specified time periods are greater than a reference amount of processed data.

In another implementation of the present application, the adjustment unit 402 is further configured to, adjust the amount of service data processed by consensus in the specified time period, where m is less than n and is a natural number, if the determined block generation time is equal to a reference time and accumulated amounts of service data that is generated in m consecutive specified time periods are less than an adjusted amount of processed data.

In another implementation of the present application, the processing unit 403 is further configured to process service data by consensus in the (m+1)th specified time period based on the adjusted amount of processed data.

Notably, the data processing device provided in the implementation of the present application can be implemented by using hardware or software. It is not limited here. The data processing device monitors an amount of service data processed by consensus in a specified time period, dynamically adjusts a block generation time based on the amount of processed data, and generates a new block based on the adjusted time. As such, a block generation speed can match service data variation, which satisfies a service need and ensures system resource utilization when service data is processed by consensus, so the system resource utilization does not fluctuate. Therefore, the balance between the service need and the system resource consumption is effectively achieved.

Figure 5:
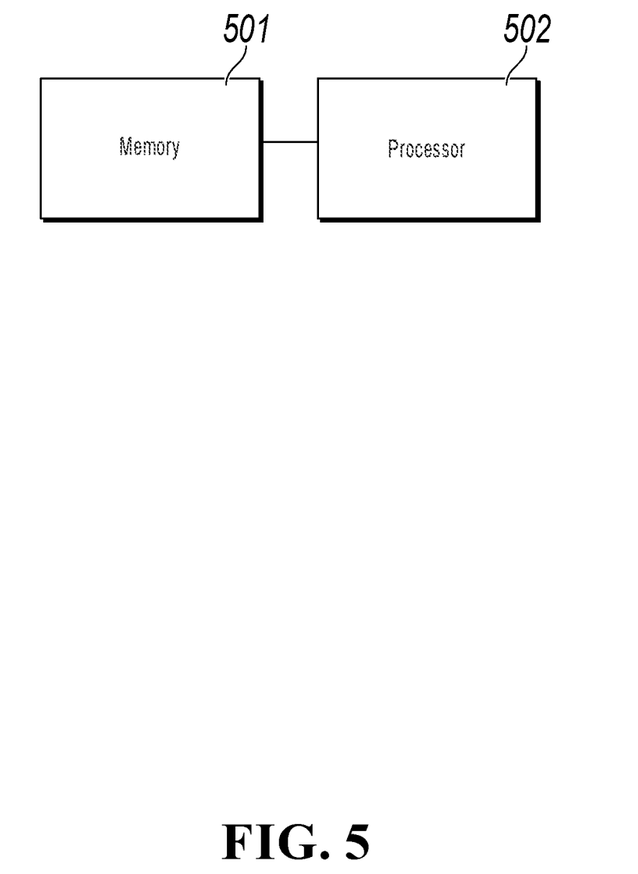
FIG. 5 is a schematic structural diagram illustrating a blockchain-based data processing device, according to an implementation of the present application.

FIG. 5 is a schematic structural diagram illustrating a blockchain-based data processing device, according to an implementation of the present application. The data processing device includes at least one memory 501 and at least one processor 502. The memory 501 stores a program, and the at least one of the processors 502 are configured to perform the following steps: monitoring an amount of service data processed by consensus in a specified time period; dynamically adjusting a block generation time based on the amount of processed data; and generating a new block based on the adjusted time.

For functions of the processor, reference can be made to the content recorded in the previous implementations. Details are not described here individually.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method processes can be considered as a direct improvement of a hardware circuit structure. Designers almost all program an improved method procedure to a hardware circuit, to obtain a corresponding hardware circuit structure. Therefore, it cannot be considered that an improvement of a method procedure cannot be implemented by using a hardware entity module. For example, a programmable logic device (PLD) (for example, a field programmable gate array (FPGA)) is a type of an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as an ABEL (Advanced Boolean Expression Language), an AHDL (Altera Hardware Description Language), Confluence, a CUPL (Cornell University Programming Language), an HDCal, a JHDL (Java Hardware Description Language), a Lava, a Lola, a MyHDL, a PALASM, and an RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the foregoing hardware description languages, so a hardware circuit that implements the logical method process can be easily obtained.

The controller can be implemented in any appropriate manner. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented in a manner of pure computer-readable program code, and the steps in the method can be logically programmed to enable the controller to further implement some functions in forms of a logic gate, a switch, an application-specific integrated circuit, a programmable logic controller, an embedded microcontroller, etc. Therefore, such a controller can be considered as a hardware component. An apparatus that is included in the controller and configured to implement various functions can be considered as a structure inside the hardware component. Alternatively, an apparatus configured to implement various functions can even be considered as both a software module for implementing the method and a structure inside the hardware component.

The system, apparatus, module, or unit illustrated in the previous implementations can be implemented by using a computer chip or an entity, or can be implemented by a product with a certain function. A typical implementation device is a computer. The computer can be, for example, a personal computer, a laptop computer, a cellular phone, a camera phone, an intelligent phone, a personal digital assistant, a media player, a navigation device, an email device, a game console, a tablet computer, a wearable device, or a combination of any of these devices.

For ease of description, the apparatus is described by dividing the apparatus into various units based on functions. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided to a general-purpose computer, a dedicated computer, an embedded processor, or a processor of another programmable data processing device, to generate a machine, so the instructions executed by a computer or a processor of another programmable data processing device generate an apparatus for implementing a specified function in one or more processes in the flowcharts and/or in one or more blocks in the block diagrams.

These computer program instructions can alternatively be stored in a computer readable memory that can instruct the computer or another programmable data processing device to work in a specific manner, so the instructions stored in the computer readable memory generate an artifact that includes an instruction apparatus. The instruction apparatus implements a specified function in one or more processes in the flowcharts and/or in one or more blocks in the block diagrams.

These computer program instructions can alternatively be loaded to a computer or another programmable data processing device, so a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more central processing units (CPU), an input/output interface, a network interface, and a memory.

The memory can include a non-persistent memory, a random access memory (RAM), a nonvolatile memory, and/or another form that are/is in a computer readable medium, for example, a read-only memory (ROM) or a flash memory (flash memory). The memory is an example of the computer readable medium.

The computer readable medium includes persistent, non-persistent, movable, and unmovable media that can store information by using any method or technology. Information can be a computer readable instruction, a data structure, a program module, or other data. Examples of the computer storage medium include but are not limited to a parameter random access memory (PRAM), a static random access memory (SRAM), a dynamic random access memory (DRAM), a random access memory (RAM) of another type, a read-only memory (ROM), an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As defined in the present specification, the computer readable medium does not include computer readable transitory media (transitory media) such as a modulated data signal and a carrier.

Notably, the term "include", "comprise", or their any other variant is intended to cover a non-exclusive inclusion, so a process, a method, a commodity, or a device that includes a series of elements not only includes those elements but also includes other elements that are not expressly listed, or further includes elements inherent to such process, method, commodity, or device. When there are no more restrictions, it is also possible that there is another same or equivalent element in the process, the method, a product, or a device that includes the element.

The present application can be described in the general context of a computer executable instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices that are connected through a communications network. In the distributed computing environments, the program module can be located in both local and remote computer storage media including storage devices.

The implementations in the present specification are all described in a progressive manner. For the same or similar parts in the implementations, reference can be made to each other. Each implementation focuses on a difference from other implementations. Particularly, a system implementation is basically similar to a method implementation, and therefore is described briefly. For the relevant parts, reference can be made to some descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims of the present application.

Figure 6:
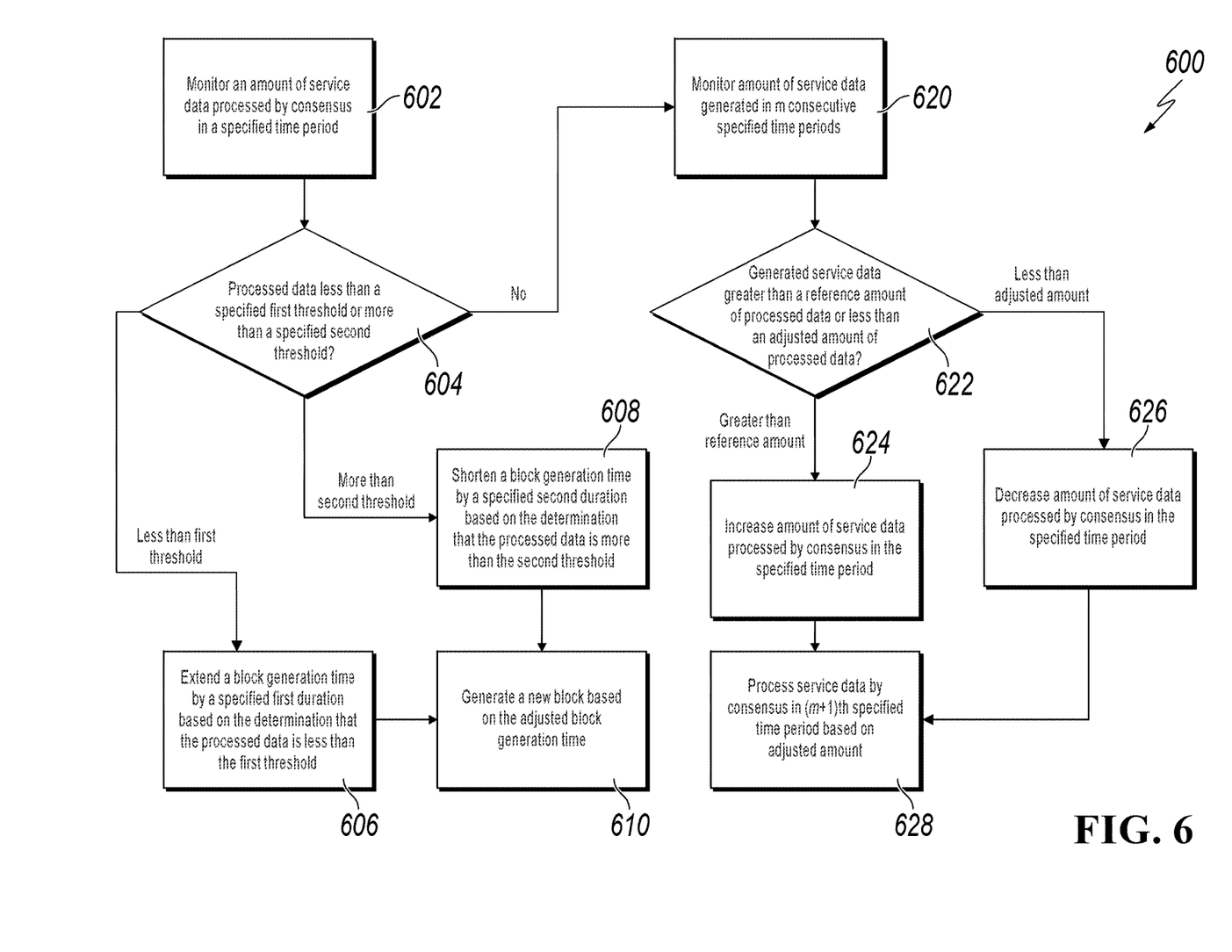
FIG. 6 is a flowchart illustrating an example of a computer-implemented method for blockchain-based data processing, according to an implementation of the present disclosure.

FIG. 6 is a flowchart illustrating an example of a computer-implemented method 600 for blockchain-based data processing, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an amount of service data processed by consensus for a blockchain in a specified time period is monitored. In some implementations, a single blockchain node can be used to perform the monitoring, where an amount of service data processed by the single blockchain node by consensus in the specified time period is monitored. Alternatively, a plurality of blockchain nodes can be separately perform the monitoring operations, and amounts of service data processed by the different blockchain nodes by consensus in the specified time period are separately monitored. In some instances, before adjusting a block generation time, a block can be generated based on a specified reference time. When the reference time expires, a new block is generated. Service data is generated in a period from the last reference time to a current reference time. In some instances, the reference time may be a duration, while in other instances, the duration time may be a timestamp. After the new block is generated, the generated service data is processed by consensus, and then service data processed by consensus is stored on or in the new block. In some instances, the specified time period can be determined based on a block generation reference time, a current block generation time, or based on actual need.

The amount of service data processed during the monitoring operations may differ. If a relatively small amount of service data is generated, the amount of service data processed by consensus in the specified time period may comprise the actual amount of generated service data. If a large amount of service data is generated (such as, one block is not large enough to store the generated service data), then the service data actually processed by consensus in the specified time period may comprise the amount of service data that is actually obtained by a consensus.

In some instances, the amount of service data processed by consensus in the specified time period can comprises or represent the amount of service data processed by consensus in n consecutive specified time periods, where n is a natural number. By doing so, the accuracy associated with subsequent adjustments of the block generation time can be increased by avoiding adjustments based on a single time period, or watching for trends over time. From 602, method 600 proceeds to 604.

At 604, a determination is made as to whether the monitored amount of processed service data in the specified time period is less than a specified first threshold amount, or whether the monitored amount of processed service data in the specified time period is more than a specified second threshold amount. In some instances, the first and second threshold amounts can be determined or identified based on a reference amount of processed data (for example, a block capacity or actual need), a minimum service data processing capability of a blockchain node, or a maximum service data processing capability of a blockchain node, among others.

In some instances, where n consecutive specified time periods are monitored, the determination of 604 may be based on the amounts of processed data that correspond to the specified time periods, as well as a progressive increase or decrease in the amount of processed data.

If it is determined that the processed amount of data is less than the first threshold value, method 600 proceeds to 606. Otherwise, if it is determined that the processed amount of data is greater than the second threshold value, method 600 proceeds to 608. If neither of those are determined to occur, in some instances, method 600 proceeds to 620 to perform additional adjustments for improved system resource utilization techniques.

At 606, the block generation time is extended by a specified first duration based on the determination that the amount of processed data is less than the first threshold value. In doing so, system resources associated with processing by consensus can be saved by increasing the amount of service data generated during the next block generation time. From 606, method 600 proceeds to 610.

At 608, the block generation time is shortened by a specified second duration based on the determination that the amount of processed data is greater than the second threshold value. By reducing the block generation time, such as where service data generation speed is significantly greater than a block generation speed, service data processing efficiency is increased by avoiding the accumulation of large amounts of service data. From 608, method 600 proceeds to 610.

At 610, a new block is generated based on the adjusted block generation time. In some instances, different methods of adjusting the block generation time may be used. For example, if the adjusted time is longer than the reference time, the calculation difficultly could be increased to decelerate block generation. If the adjusted time is shorter than the reference time, then the calculation difficulty could be decreased to accelerate block generation. After 610, method 600 can stop, or can return to 602 to continue further monitoring.

In cases where the block generation time remains unchanged, such as where the monitored processed data is more than the specified first threshold value and less than the specified second threshold value, an additional or alternative set of operations can be performed. Specifically, method 600 moves to 620, where an amount of service data generated in m consecutive specified time periods is monitored. The value m is a natural number, and is less than the n (of the n consecutive specified time periods previously described). From 620, method 600 continues at 622.

At 622, a determination is made as to whether the monitored generated service data amount in them consecutive specified time periods is greater than a reference amount of processed data, as well as whether the monitored amounts of generated service data in the m consecutive specified time periods are less than an adjusted amount of processed data. If it is determined that the monitored amounts of generated data are greater than the reference amount of processed data, then method 600 proceeds to 624. If the amounts are less than the adjusted amount of processed data, then method 600 proceeds to 626. If neither of the determinations occur, then method 600 stops, or returns to 602 or 620 for further monitoring.

At 624, in response to determining that the generated service data in the m consecutive specified time periods is greater than a reference amount of the processed data, the amount of service data processed by consensus in the specified time period can be increased. An extent to which the amount of processed data is increased can be determined based on the reference amount of processed service data. From 624, method 600 proceeds to 628.

At 626, in response to determining that the generated service data in the m consecutive specified time periods is less than an adjusted amount of processed data, the amount of service data processed by consensus in the specified time period is decreased. The decrease occurs as the determination indicates that the service data generation may be decelerating. From 626, method 600 proceeds to 628.

At 628, service data is processed by consensus in the (m+1)th specified time period based on the adjusted amount of processed data. After 628, method 600 can stop, or can return to 602 or 620 to continue further monitoring of the blockchain.

The processes described herein can be used to ensure that block generation speed can match service data variations, which satisfies a service need and ensures system resource utilization when service data is proceed by consensus, thereby causing the system resource utilization not to fluctuate. A balance between the service need and the system resource consumption is effectively achieved. Further, by dynamically adjusting the amount of service data processed by consensus, system resource utilization can be improved even when a block generation speed has not been changed.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   monitoring, by a blockchain node, amounts of service data processed by consensus in m consecutive specified time periods, wherein m is a natural number;
   determining, by the blockchain node, that 1) a block generation time is equal to a reference time, 2) the amounts of service data processed by consensus in each specified time period of m consecutive specified time periods are greater than a reference amount of processed data or less than an adjusted amount of processed data;
   adjusting, by the blockchain node, an amount of service data processed by consensus in a specified time period;
   processing, by the blockchain node, service data by consensus in a (m+1)th specified time period based on the adjusted amount of processed data;
   monitoring amounts of service data processed by consensus in each time period of m consecutive time periods;
   determining that the amounts of service data processed by consensus in each time period of m consecutive time periods are the reference amount of processed data;
   increasing, as an increased reference amount of processed data, the reference amount of processed data; and
   using the increased reference amount of processed data as an amount of service data to be processed in a next time period.

2. The computer-implemented method of claim 1, wherein adjusting the amount of service data processed by consensus in the specified time period comprises:
   if the amounts of service data in each specified time period of m consecutive specified time periods are greater than the reference amount of processed data, increasing the amount of service data processed by consensus in the specified time period.

3. The computer-implemented method of claim 1, wherein adjusting the amount of service data processed by consensus in the specified time period comprises:
   if the amounts of service data in each specified time period of m consecutive specified time periods are less than the adjusted amount of processed data, decreasing the amount of service data processed by consensus in the specified time period.

4. The computer-implemented method of claim 1, comprising:
   obtaining service data in an amount less than the reference amount of processed data; and
   processing the service data by consensus.

5. The computer-implemented method of claim 1, comprising:
   obtaining service data in an amount larger than the reference amount of processed data; and
   processing, by consensus, the service data in an amount that corresponds to the reference amount of processed data.

6. The computer-implemented method of claim 1, comprising:
   determining that the increased reference amount of processed data reaches a specified maximum value; and
   shortening the block generation time.

7. The computer-implemented method of claim 6, comprising:
   determining that an amount of service data processed by consensus is less than the specified maximum value; and
   prolonging the block generation time.

8. The computer-implemented method of claim 7, comprising:
   determining that the block generation time reaches the reference time; and
   decreasing the amount of service data processed by consensus to the reference amount of processed data.

9. The computer-implemented method of claim 1, comprising:
   storing the service data processed by the consensus in a new block.

10. A non-transitory, computer-readable medium storing one or more instructions executable by a computer system to perform operations comprising:
    monitoring amounts of service data processed by consensus in m consecutive specified time periods, wherein m is a natural number;
    determining that 1) a block generation time is equal to a reference time, 2) the amounts of service data processed by consensus in each specified time period of m consecutive specified time periods are greater than a reference amount of processed data or less than an adjusted amount of processed data;
    adjusting an amount of service data processed by consensus in a specified time period;
    processing service data by consensus in a (m+1)th specified time period based on the adjusted amount of processed data;
    monitoring amounts of service data processed by consensus in each time period of m consecutive time periods;
    determining that the amounts of service data processed by consensus in each time period of m consecutive time periods are the reference amount of processed data;
    increasing, as an increased reference amount of processed data, the reference amount of processed data; and
    using the increased reference amount of processed data as an amount of service data to be processed in a next time period.

11. The non-transitory, computer-readable medium of claim 10, wherein adjusting the amount of service data processed by consensus in the specified time period comprises:
    if the amounts of service data in each specified time period of m consecutive specified time periods are greater than the reference amount of processed data, increasing the amount of service data processed by consensus in the specified time period.

12. The non-transitory, computer-readable medium of claim 10, wherein adjusting the amount of service data processed by consensus in the specified time period comprises:

if the amounts of service data in each specified time period of m consecutive specified time periods are less than the adjusted amount of processed data, decreasing the amount of service data processed by consensus in the specified time period.

13. The non-transitory, computer-readable medium of claim 10, wherein the operations comprise:

obtaining service data in an amount less than the reference amount of processed data; and processing the service data by consensus.

14. The non-transitory, computer-readable medium of claim 10, wherein the operations comprise:

obtaining service data in an amount larger than the reference amount of processed data; and processing, by consensus, the service data in an amount that corresponds to the reference amount of processed data.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

monitoring amounts of service data processed by consensus in m consecutive specified time periods, wherein m is a natural number;

determining that 1) a block generation time is equal to a reference time, 2) the amounts of service data processed by consensus in each specified time period of m consecutive specified time periods are greater than a reference amount of processed data or less than an adjusted amount of processed data;

adjusting an amount of service data processed by consensus in a specified time period;

processing service data by consensus in a (m+1)th specified time period based on the adjusted amount of processed data;

monitoring amounts of service data processed by consensus in each time period of m consecutive time periods;

determining that the amounts of service data processed by consensus in each time period of m consecutive time periods are the reference amount of processed data:

increasing, as an increased reference amount of processed data, the reference amount of processed data; and using the increased reference amount of processed data as an amount of service data to be processed in a next time period.

16. The computer-implemented system of claim 15, wherein adjusting the amount of service data processed by consensus in the specified time period comprises:

if the amounts of service data in each specified time period of m consecutive specified time periods are greater than the reference amount of processed data, increasing the amount of service data processed by consensus in the specified time period.

17. The computer-implemented system of claim 15, wherein adjusting the amount of service data processed by consensus in the specified time period comprises:

if the amounts of service data in each specified time period of m consecutive specified time periods are less than the adjusted amount of processed data, decreasing the amount of service data processed by consensus in the specified time period.

18. The computer-implemented system of claim 15, wherein the one or more operations comprise:

obtaining service data in an amount less than the reference amount of processed data; and processing the service data by consensus.

19. The computer-implemented system of claim 15, wherein the one or more operations comprise:

obtaining service data in an amount larger than the reference amount of processed data; and processing, by consensus, the service data in an amount that corresponds to the reference amount of processed data.

* * * * *

UNITED STATES PATENT AND TRADEMARK OFFICE
CERTIFICATE OF CORRECTION

PATENT NO. : 11,947,564 B2
APPLICATION NO. : 17/688639
DATED : April 2, 2024
INVENTOR(S) : Hao Wu It is certified that error appears in the above-identified patent and that said Letters Patent is hereby corrected as shown below:

On the Title Page

Column 2, "Other Publications" section, Line 1, please replace "Subhann" with -- Shubham --;

Column 2, "Other Publications" section, Lines 1-2, please replace "Annol, Kannat" with -- Amol, Kamat --;

Column 2, "Other Publications" section, Line 4, please replace "docunnent" with -- document --;

In the Claims

Column 18, Line 7, Claim 15, please replace "data:" with -- data; --.

Signed and Sealed this
Twenty-eighth Day of May, 2024

Katherine Kelly Vidal
*Director of the United States Patent and Trademark Office*